US008997087B2

(12) United States Patent
Beatty et al.

(10) Patent No.: US 8,997,087 B2
(45) Date of Patent: Mar. 31, 2015

(54) METHOD AND SYSTEM FOR DEVICE CONFIGURATION AND CUSTOMIZATION DURING MANUFACTURING PROCESS (75) Inventors: Kevin Beatty, Elmira (CA); Harold Hsu, Richmond (CA); Miguel Watler, Mississuga (CA); Nader Newman, Brampton (CA); Rastislav Hodul, Port Moody (CA)

(73) Assignee: Psion Inc., Mississauga, Ontario (CA)

( * ) Notice: Subject to any disclaimer, the term of this patent is extended or adjusted under 35 U.S.C. 154(b) by 1204 days.

(21) Appl. No.: 12/765,959

(22) Filed: Apr. 23, 2010

(65) Prior Publication Data
US 2011/0265078 A1 Oct. 27, 2011

(51) Int. Cl.
G06F 9/44 (2006.01)
G06F 9/445 (2006.01)

(52) U.S. Cl.
CPC .......................... *G06F 8/61* (2013.01)
USPC ............ 717/173; 717/101; 717/113; 717/116

(58) Field of Classification Search
CPC ........ G06F 8/51; G06F 1/1616; G06F 1/1643
USPC ................... 717/173, 101, 113, 116
See application file for complete search history.

(56) References Cited

U.S. PATENT DOCUMENTS

| 7,240,106 | B2 | 7/2007 | Cochran et al. | |
| 7,542,759 | B2* | 6/2009 | Edwards et al. | 455/419 |
| 7,676,802 | B2* | 3/2010 | Mittal | 717/168 |
| 2002/0116615 | A1* | 8/2002 | Nguyen et al. | 713/168 |
| 2003/0110480 | A1* | 6/2003 | Rajaram | 717/140 |
| 2004/0268340 | A1* | 12/2004 | Steeb et al. | 717/174 |
| 2006/0085522 | A1* | 4/2006 | Spry | 709/220 |
| 2007/0113186 | A1 | 5/2007 | Coles et al. | |
| 2007/0266421 | A1* | 11/2007 | Vaidya et al. | 726/1 |
| 2008/0098380 | A1* | 4/2008 | Klusmeyer | 717/168 |
| 2008/0163092 | A1* | 7/2008 | Rao | 715/771 |
| 2008/0288639 | A1* | 11/2008 | Ruppert et al. | 709/225 |
| 2009/0031296 | A1* | 1/2009 | Boudreau et al. | 717/174 |
| 2009/0187901 | A1* | 7/2009 | Kanai | 717/173 |
| 2010/0162374 | A1* | 6/2010 | Nair | 726/7 |
| 2012/0167047 | A1* | 6/2012 | Wyler et al. | 717/122 |

OTHER PUBLICATIONS

Corresponding PCT International Application No. PCT/CA2011/000432 Search Report dated Aug. 17, 2011.

(Continued)

*Primary Examiner* — Idriss N Alrobaye
*Assistant Examiner* — Getente A Yimer (57) ABSTRACT A method and a system for customizing a handheld device being produced in manufacturing assembly. The method provides customization via configuration of the device by a server in a communication network. In response to a configuration predefined such via a customer purchase order, assigning, at the server, a group to the at least one handheld device, identifying, at the server, a configuration of components for download to the at least one handheld device, the configuration of components associated with the assigned group, and downloading, for installation at the handheld device, the configuration of components to the at least one handheld device of the assigned group.

13 Claims, 5 Drawing Sheets (56) References Cited

OTHER PUBLICATIONS

Corresponding PCT International Application No. PCT/CA2011/000432 Written Opinion of the International Searching Authority.

International Preliminary Report on Patentability and Written Opinion for Counterpart International Patent application No. PCT/CA2011/000432 mailed Nov. 1, 2012.

* cited by examiner

METHOD AND SYSTEM FOR DEVICE CONFIGURATION AND CUSTOMIZATION DURING MANUFACTURING PROCESS

FIELD

The present disclosure relates generally to a method and system for configuring a handheld computing device during the manufacturing assembly process.

BACKGROUND

Handheld mobile computing devices have proliferated as their usefulness and functionality have improved. To the extent that the handheld device may be configurable or customizable for different classes of user, the utility the devices is enhanced.

Handheld computers are available in many variations of user functionality. For example, including barcode laser scanning, digital photo and document scanning, Global Positioning System (GPS), MPEG audio layer 3 (MP3) players, user input means (such as keyboard versus touch screen input) and wireless radio frequency-based (RF) communications functionality. It is apparent that depending on the particular functionality selected, to customize for a given handheld variant, appropriate software/firmware configurations, including appropriate software drivers, software applications, or even operating system variants, may be necessary.

Functionality of the handheld devices is typically tested and calibrated during device manufacturing assembly, to ensure reliability, quality, and conformance to applicable performance standards. Conducting testing and calibration of increasingly complex handheld functionalities and variants has resulted in increasingly longer production times, increased errors and rework, and lower test yields. Advantageously, the provisioning of software components to provide customized device functionality, based on a given hardware configuration or platform, may be deferred just prior to testing by configuring the handheld device with the appropriate software/firmware at such late stage.

SUMMARY OF THE INVENTION

Provided is a method for configuring at least one handheld device by a server in a communication network including a plurality of handheld devices after installation of Operating System. The method comprises of generating a discovery request at the server, the discovery request targeted to the plurality of handheld devices; in response to the discovery request, generating a request for communication with the server from at least one handheld device; establishing communication between the server and the at least one handheld device; assigning, at the server, a group to the at least one handheld device; identifying, at the server, a configuration of components for download to the at least one handheld device, the configuration of components associated with the assigned group; and downloading, for installation at the handheld device, the configuration of components to the at least one handheld device of the assigned group.

The method may additionally include installing the configuration of components at the handheld device.

In one embodiment, the method includes reporting to the server the results of installing the configuration of components including successful component installations and failed component installations.

In another embodiment, the assigned group is associated with a predefined ordering of configuration components, and downloading comprises downloading the configuration of components according to the predefined order.

In yet another embodiment, the method further comprises installing, at the handheld device, the configuration of components according to the predefined order of downloading.

Provided is another embodiment which includes displaying, at a graphical user interface (GUI) display of the server, the configuration of components in the predefined order for downloading, and modifying the predefined order.

In yet another exemplary embodiment, the configuration of components downloaded comprise a configuration of software components.

In another variant embodiment, at least one component of the software components downloaded is selected from the group of software components consisting of: a software application, a software operating system, a software driver.

The method may additionally encompass establishing communications between the server and the handheld device further comprises communication an informational element for unique identification of the handheld device, the informational element selected from the group of informational elements consisting of: a serial number, an operating system identifier, a device model number, IP addresses, and a terminal name.

Also provided is a server system comprising a server discovery module for generating and communicating a discovery request to a plurality of handheld devices in a communication network; and a server configuration module for: assigning a group to the at least one handheld device; identifying a configuration of components for download to the at least one handheld device, the configuration of components associated with the assigned group; and downloading the configuration of components to the at least one handheld device of the assigned group.

In one embodiment, the server system includes a graphical user interface display screen for displaying and updating of the identified configuration of components.

The configuration information is established by analyzing the ordering information based on the pre-defined set of rules.

Also provided is a handheld device in a communication network including a plurality of handheld devices and a server, the handheld device comprises a processor; a memory; a device configuration module, the device configuration module including: a device discovery module for detecting a discovery request initiated at the server and for establishing further communication with the server; a device download module for receiving a downloaded configuration of components from the server; and a device installation module for installing, in the memory of the handheld device, the downloaded configuration of components from the server.

In an embodiment, the handheld device comprises an update detection module for detecting an update request targeted to a group assigned, by the server, to include the handheld device.

The handheld device may further include capability for updating the installed configuration of components.

In yet another embodiment, the device discovery module communicates to the server an informational element for unique identification of the handheld device, the informational element selected from the group of informational elements consisting of: a serial number, an operating system identifier, a device model number, IP addresses, and a terminal name.

BRIEF DESCRIPTION OF THE DRAWINGS

Embodiments will now be described by way of example only, with reference to the following drawings in which.

DETAILED DESCRIPTION

It would be advantageous to provide a handheld computer which is configurable with varying functionalities while maximizing commonality of hardware modules or configuration of the handheld computer. Therefore, there is a need to discovering and configuring handheld devices terminals during manufacturing assembly and test, without increasing the network traffic.

By maximizing commonality of hardware configurations and components, a manufacturer is able to implement a late-stage device customization process in manufacturing assembly which is more responsive to incoming purchase orders from customers, positively impacting manufacturing expenses. Providing such late-stage customization or configuration capability also positively affects hardware component inventory carrying costs for inventory that a manufacturer needs to have on hand to support manufacturing assembly and production, as a smaller set of hardware modules or platforms could be deployed and then configured with appropriate software/firmware at the late-stages of manufacturing assembly, to create handheld computers with different functionalities.

Figure 1:
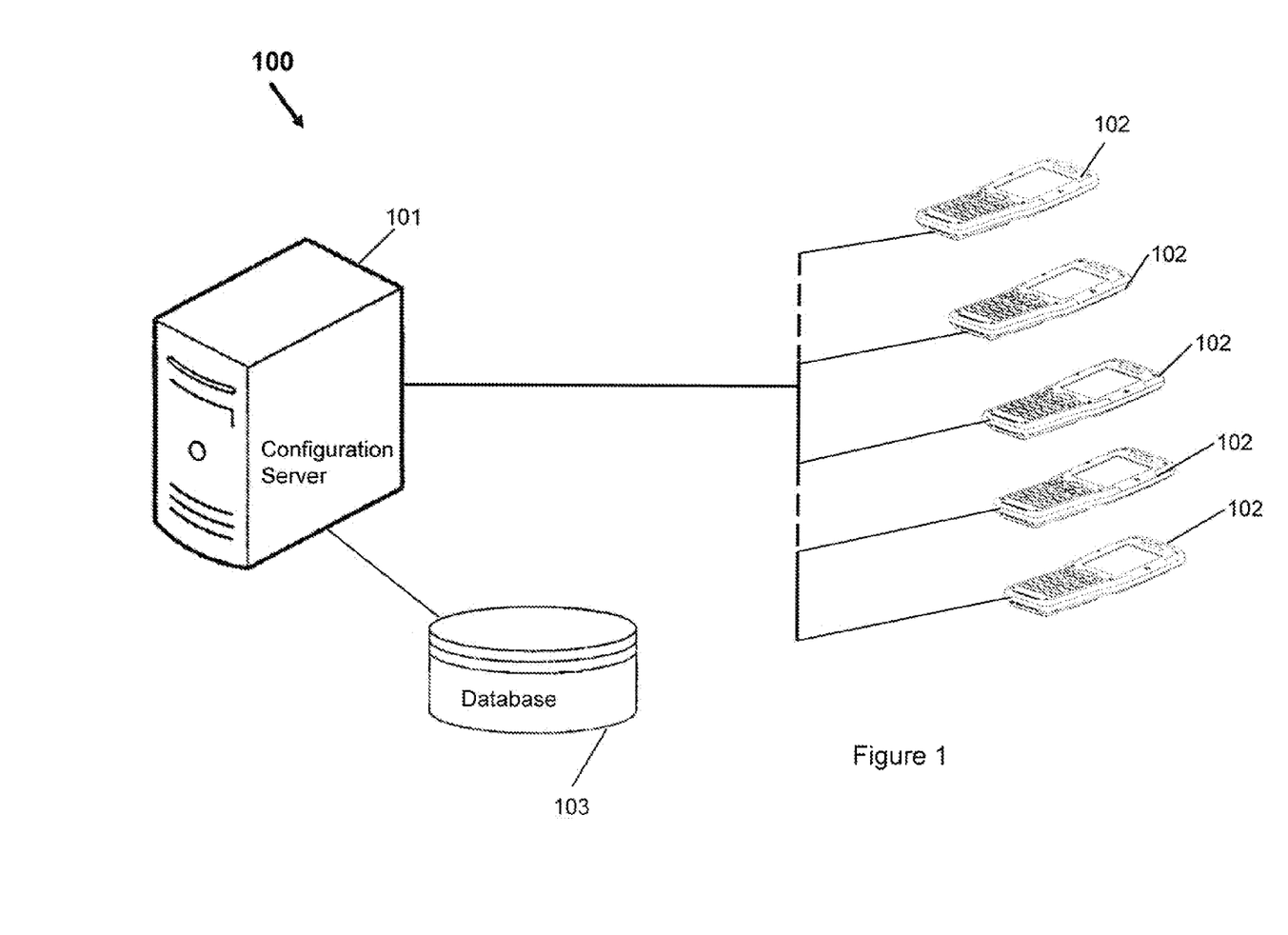
FIG. 1 illustrates an exemplary network communication system in accordance with an embodiment where at least one server discovers and manages a plurality of handheld computers.

Referring now more particularly to the accompanying figures, FIG. 1 depicts an exemplary network communication system in accordance with an embodiment where at least one server discovers and manages a plurality of handheld computers. The network system 100 of FIG. 1, which may be a wired or a wireless network, forms a closed network where at least one server, such as configuration server 101, remotely discovers and manages a plurality of handheld computer devices 102.

Configuration server 101 may optionally include a graphical user interface display screen (not depicted in FIG. 1), to enable an operator or administrator to interact therewith. Via configuration server 101, an administrator may manage the processes of initiating discovery, establishing communication with handheld devices, managing groups (including assigning groups, modifying groups, and deleting groups), and the selecting the configuration of components and data to be downloaded from configuration server 101 to one of more of handheld devices 102. A group may be associated with a batch of handheld devices according to a customer purchase order. The group may typically specify a predefined grouping of components for that batch of handheld devices, providing the starting point for identifying and assigning a group at the server. Configuration server 101 also includes, or is communicatively coupled to, a database 103. Database 103 may be, or may be communicatively coupled to, an order management system from which the customer purchase order is sourced.

Database 103 of network 100 may stores various configuration files and other related configuration information. Database 103 may include, for example, but is not limited to, configuration information related to the various groups assigned and managed by the configuration server 101, and components and data for respective configurations of handheld devices 102, including for configuration updates. The database 103 may be accessed, or read and updated, via the GUI of configuration server 101, further employing a suitable web service interface, optionally. It would be appreciated by one of ordinary skill in the art that the configuration server 101 may contain additional functions/elements/mechanisms other than those illustrated in FIG. 1.

Still with reference to FIG. 1, configuration server 101 may communicate with the plurality of handheld devices 102 using various communication schemes, including, but not limited to, wireless connections via a secure or non-secure Wireless Local Area Network (WLAN), Wireless Wide Area Network (WWAN) or BLUETOOTH (Bluetooth™).

Configuration server 101 of network system 100 implements a discovery mechanism for discovering new handheld devices within the network and providing an initial deployment to any newly discovered handheld devices, and also an update mechanism for updating the discovered handheld devices. The discovery requests may be multi-cast or broadcasted, or any variation thereof; it is contemplated that the specific implementation of IP addressing for discovery may be made taking into account the network management considerations, such as security and bandwidth concerns, of the network administrator or the relevant network administration policy. A discovery request may be sent out periodically until terminated at configuration server 101. An update discovery request may be sent out periodically until terminated at the configuration server 101, or all the targeted (that is, targeted via an assigned group) handheld devices take an action in response to the discovery request.

Figure 2A:
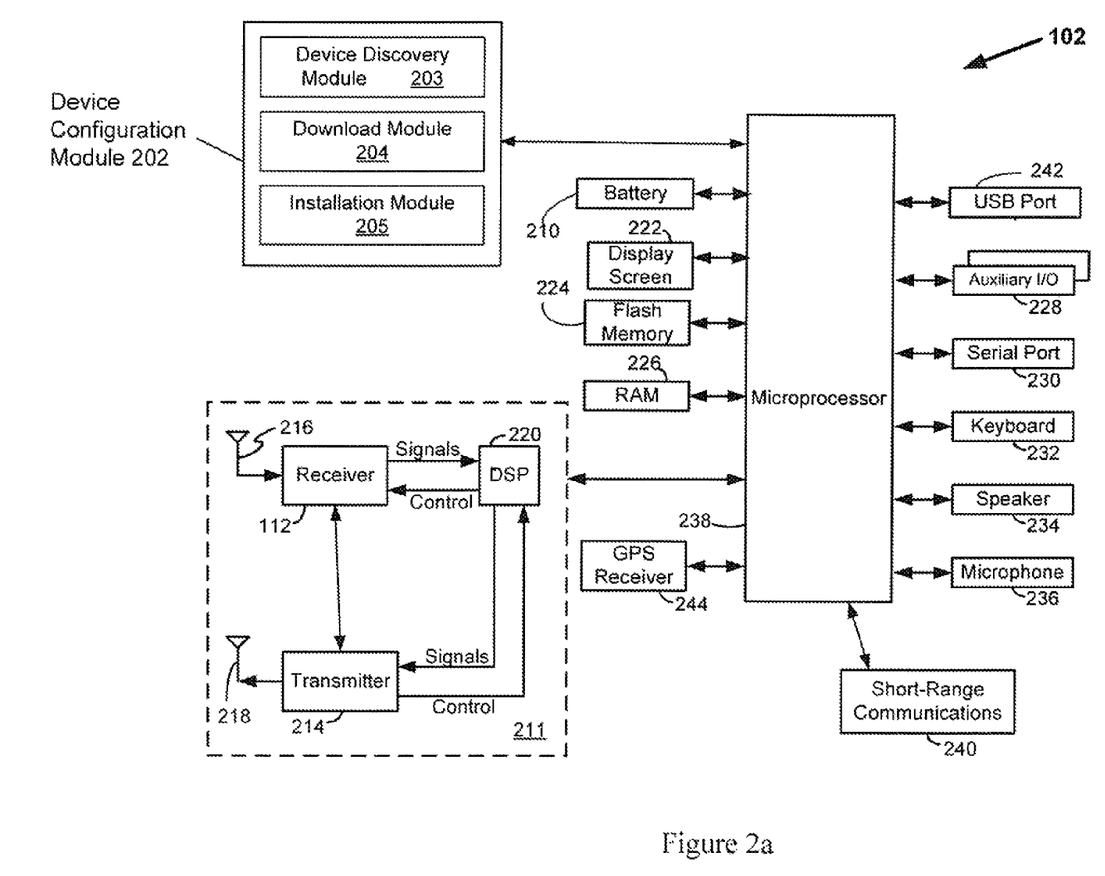
FIG. 2a is a conceptual diagram illustrating the functional subsystems of the handheld computer including an exemplary device configuration module.
Figure 2B:
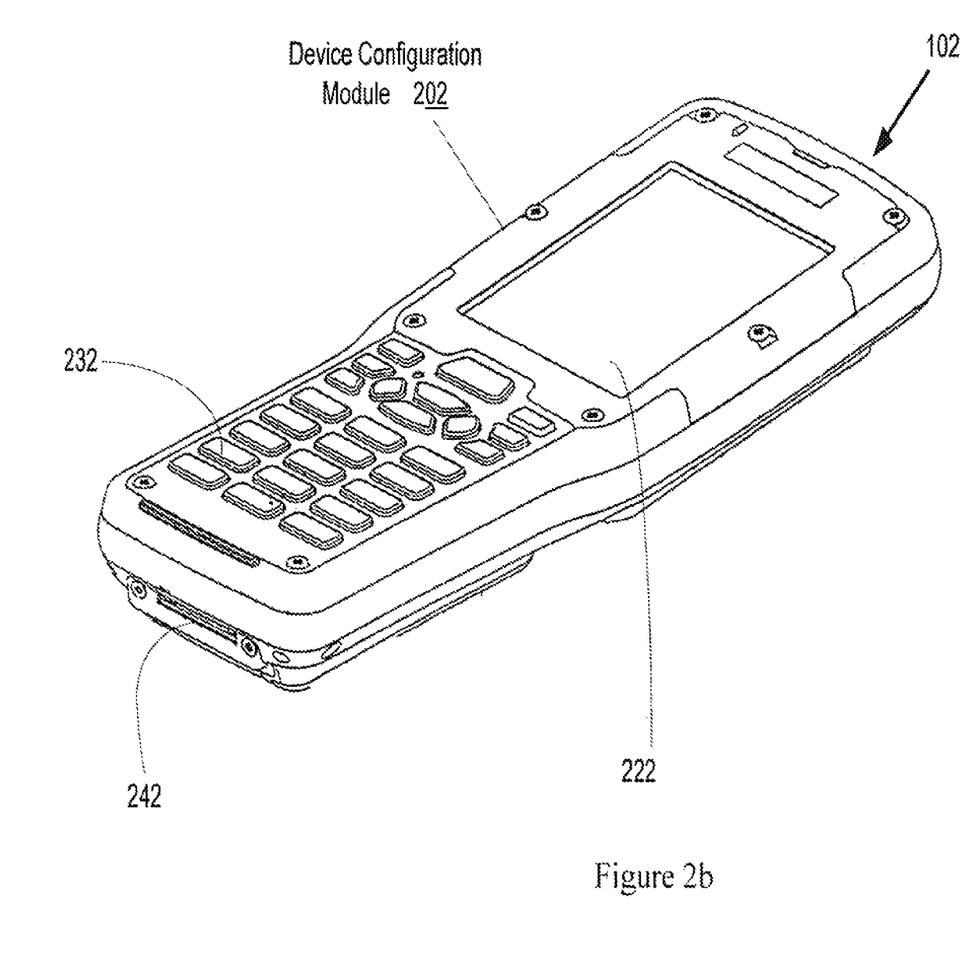
FIG. 2b shows an exemplary perspective view of the handheld computer including therewithin an exemplary device configuration module.

FIG. 2 illustrates an exemplary architecture of the functional subsystems of handheld computer 102. Handheld computer 102 will be referred to variously and interchangeably as a handheld computing device, a handheld device, a mobile computer, or a mobile device in the disclosure herein. The handheld computer 102 may have the capability of communicating at least data, and possibly both data and audio, to and from servers as well as data acquisition sources within a communication network.

Handheld computer 102 may include wired or wireless communication capability. In the wireless configuration, handheld computer 102 typically includes radio frequency (RF) communication subsystem 211, which includes a receiver 212, a transmitter 214, and associated components, such as one or more embedded or internal antenna elements 216 and 218, and a processing module such as a digital signal processor (DSP) 220. As will be apparent to those skilled in field of communications, the particular design of the RF communication subsystem 211 depends on the specific communication network in which handheld device 102 is intended to operate, but may include communication functionalities such as radio-frequency identification (RFID), Wi-Fi WLAN based on IEEE 802.11 standards, Zigbee, Zwave and the like.

The handheld device 102 includes a microprocessor 238 which controls general operation of the handheld device 102. The microprocessor 238 also interacts with functional device subsystems such as screen display module 222, a flash memory 224, random access memory (RAM) 226, auxiliary input/output (I/O) subsystems 228, serial port 230, keyboard module 232, speaker 234, microphone 236, short-range communications subsystem 240 such as Bluetooth™ for example, and Universal Serial Bus (USB) expansion port 242 for peripheral. The handheld device 102 may include a power source such as battery module 210 which may also be removable and replaceable from the handheld device. The handheld device 102 may also include a positioning device 244, such as a GPS receiver for example, for receiving positioning information.

Still with regard to FIG. 2, operating system software used by the microprocessor 238 may be stored in a persistent store such as the flash memory 224, which may alternatively be a read-only memory (ROM) or similar storage element (not shown). Those skilled in the art will appreciate that the operating system, specific device applications, or parts thereof, may be temporarily loaded into a volatile store such as RAM 226.

The microprocessor 238, in addition to its operating system functions, enables execution of software applications on the handheld device 102. A predetermined set of applications, which control basic device operations, or even more customized, advanced device operations, may be installed on the handheld device 102 during its manufacture, such as during the components configuration process described herein. These operations typically include data and voice communication applications, for example. The configuration of components may be downloaded onto the handheld device 102 via the communication subsystem 211, an auxiliary I/O subsystem 228, serial port 230, USB port 242, short-range communications subsystem 240, or any other suitable subsystem, for execution by the microprocessor 238. Such customization increases the functionality of the handheld device 102 and may provide enhanced on-device features, communication-related features, or both.

Display screen module 222 of handheld device 102 may be used to visually present an application's graphical user interface (GUI) to the user via a display screen. The display screen module 222 may employ a touch screen display, in which case the user can manipulate application data by modifying information on the GUI using direct touches by finger. Depending on the type of handheld device 102, the user may have access to other types of input devices, such as, for example, a scroll wheel, trackball, light pen or touch sensitive screen.

Device configuration module 202 of handheld device 102 may be described with reference to its constituent modules: device discovery module 203, download module 204, and installation module 205.

Device discovery module 203 may comprise any combination of software, firmware and hardware for detecting a discovery request initiated at the server and for establishing further communication with the server.

Download module 204 may comprise any combination of software, firmware and hardware to accept downloads of selected components transmitted from configuration server 101, the components related to a respective configuration of handheld device 102. Download module 204 of the handheld device 102 may detect when the downloading of configuration components is finished, and may launch installation module 205 for installing the components downloaded in a memory of handheld device 102.

Installation module 205 may comprise any combination of software, firmware and hardware for accomplishing actual installation of the components, and also for reporting the progress of the installation to configuration server 101. This may involve copying files, launching a setup function to execute installation scripts, and performing post installation actions. The installation module 205 may processes downloaded configuration components and may report success or failure on a component by component basis. When installation is completed, it may transfer the details of the installation log file for a particular handheld device back to the configuration server 101. Configuration server 101 may then update database 103, or more precisely, a registry component at database 103 which tracks and stores such configuration information.

Figure 3:
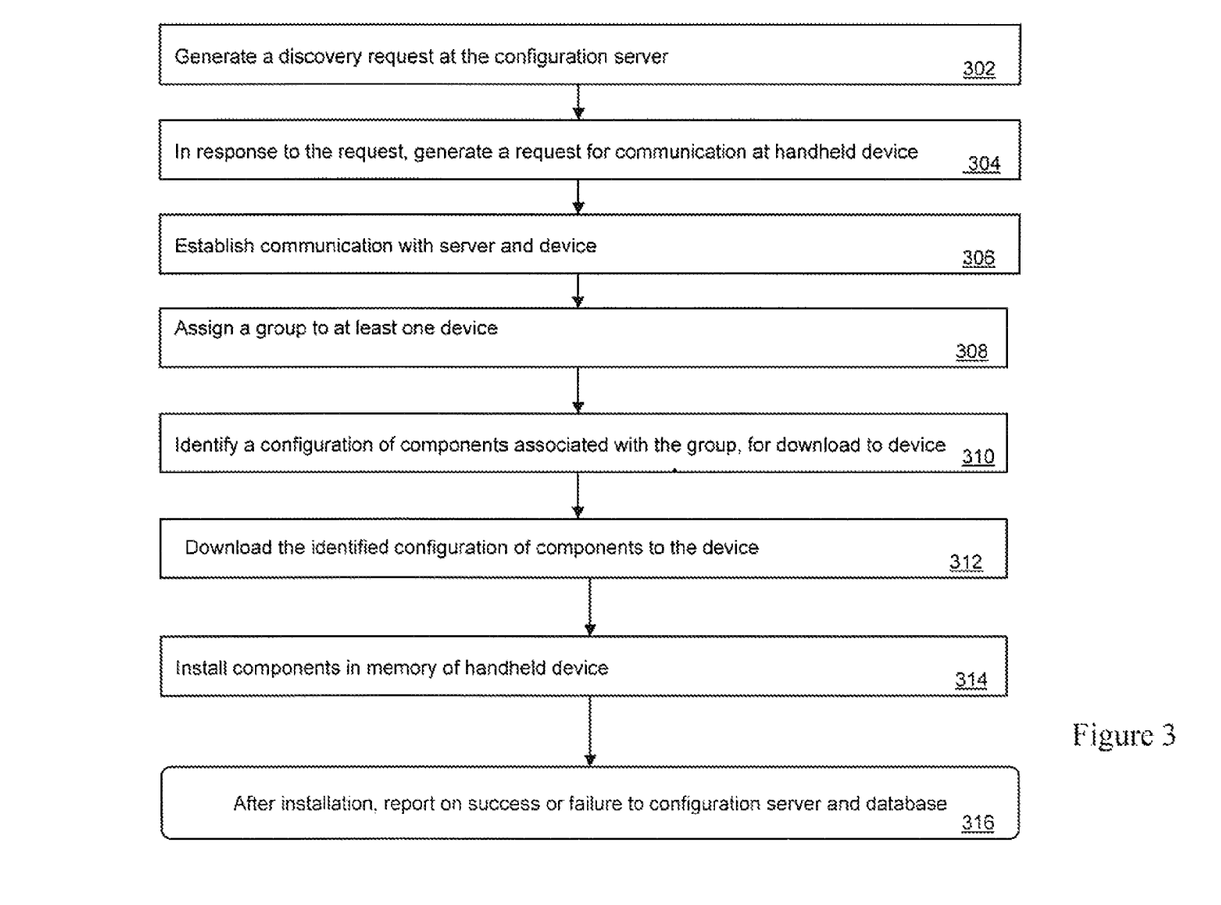
FIG. 3 is an illustrative flowchart showing exemplary process steps involved in one embodiment for configuring the handheld device.

FIG. 3 illustrates exemplary process steps involved in one embodiment for configuring the handheld device with appropriate components, such as based on a purchase order specifying a desired, predefined configuration. It will become evident from the following disclosure that the appropriate components for the handheld device refers to the particular selection of components which are associated with a desired custom configuration or functionality, to be downloaded for installation thereon, in order to create a handheld device of desired functionality.

At step 302, a discovery request is generated at configuration server 101, the discovery request targeted to any or all of the plurality of handheld devices 102 in network 100.

At step 304, in response to the discovery request, a request for communication with the configuration server 101 is generated from at least one of the handheld devices 102. When the handheld devices 102 are discovered initially, they are identified as the "unassigned group" in the server. Each discovered handheld device 102 in the unassigned group is then assigned to one or more groups. In one exemplary embodiment, each discovered handheld device 102 in the unassigned group is subsequently assigned to one or more groups based on its pre-existing hardware and/or firmware configuration.

At step 306, communication is established between the server and the at least one handheld device. Handheld device 102 may, for example, communicate to configuration server 101 an informational element for unique identification of the handheld device. The informational element may include: a serial number, a unique identifier of an operating system or an operating system version, a device model number, IP addresses, and a terminal name. Once the handheld device 102 responds to the discovery request and communicates its information, it may be added into a management list in the database 103.

At step 308, at configuration server 101, a group is assigned to the at least one handheld device 102. In one exemplary embodiment, the discovered client device 102, formerly in the unassigned group, is now assigned to one or more groups based on its pre-existing hardware and/or firmware configuration.

The assignment of handheld device 102 to a group allows one or more discovered client devices 102 to be targeted for configuring, in accordance with a pre-defined selection of components uniquely associated with that given group. In one example, the group can be used as a functional unit that ties, or associates, a set of components (e.g., files) or data to a set of handheld devices 102. In this example, a set of components is downloaded to the entire group handheld devices 102 simultaneously or nearly simultaneously. Any given component may be associated with zero to any number of groups. The assigned group may also be associated with a predefined ordering of configuration components, for downloading the configuration of components according to the predefined order.

In another variation, it is contemplated that, at the graphical user interface (GUI) display of the server, the configuration of components in the predefined order for downloading may be displayed, and then that predefined order may be modified by the operator or administrator.

At step 310, at the configuration server 101, the unique configuration of components for provisioning via download to handheld device(s) 102 is identified, the configuration of components being associated with the group assigned. Once a given handheld device 102 is assigned to a respective group, configuration server 101 is then able to download the associated configuration components so that the handheld devices 102 may configured on a group basis.

At step 312, the associated configuration of components is downloaded to the handheld device(s) 102 belonging to the assigned group. The configuration of components may be downloaded onto the client device 102 via the communication subsystem 211, an auxiliary I/O subsystem 228, serial port 230, USB port 242, short-range communications subsystem 240, or any other suitable subsystem, for execution by the microprocessor 238.

At step 314, the configuration of components downloaded is installed into a memory of the handheld device(s) 102.

At step 316, the results of the configuration component installations, including successful component installations and failed component installations, may be reported to configuration server 101.

Figure 4:
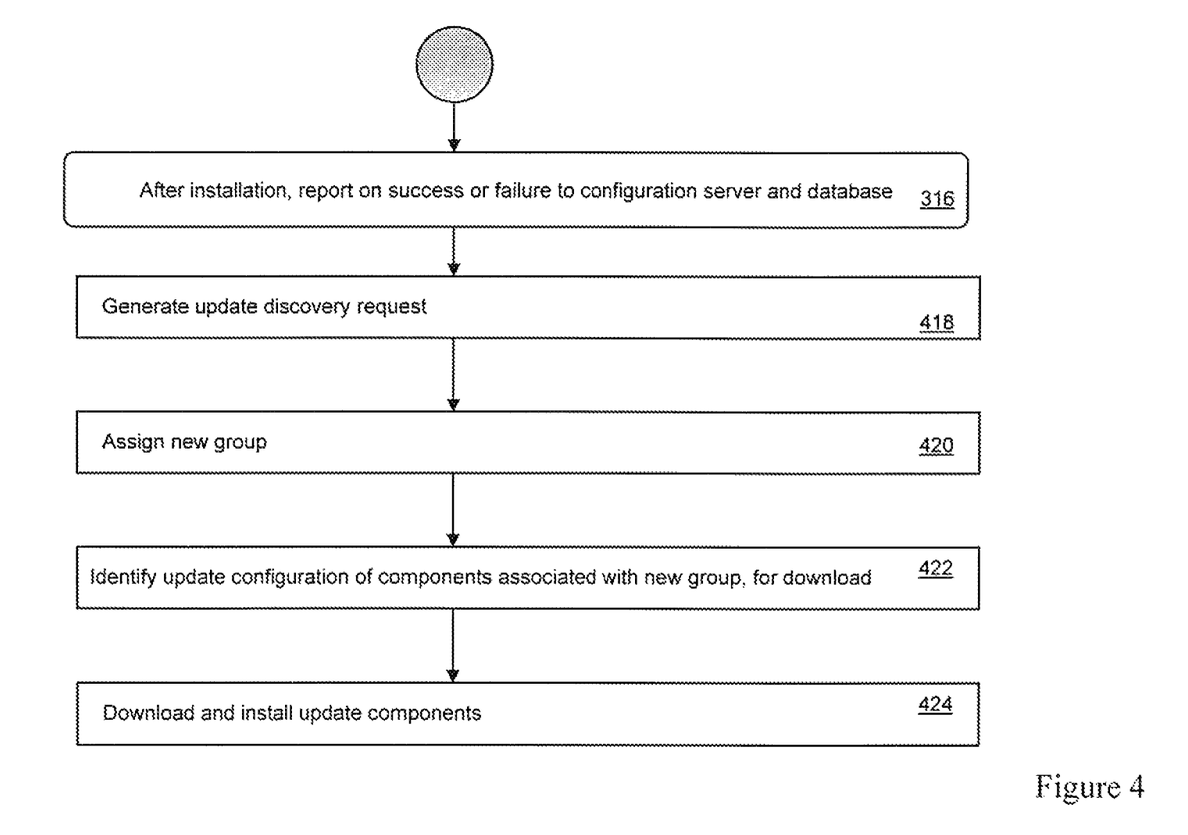
FIG. 4 is an illustrative flowchart showing exemplary process steps involved in yet another embodiment for updating an existing configuration of the handheld device.

FIG. 4 illustrates a further variation of the exemplary process of FIG. 3, whereby the configuration components of the handheld device in a group may be updated. For instance, some or all handheld devices assigned to a given group may be moved to another group by sending a new discovery request, an update request, at step 418, to initiate the process. At step 420, configuration update server may assign the new group desired, and identifies an updated configuration of components at step 422, for download and installation at step 424. It is also contemplated that, for updates, the handheld devices 102 may comprise an update detection module (not shown) for detecting discovery requests for updates.

Although a mobile or handheld computer has been used to establish a context for disclosure herein, it is contemplated as having wider applicability within the manufacturing test and assembly, and even by extension to field operations. Furthermore, the disclosure herein has been described with reference to specific exemplary embodiments; however, varying modifications thereof will be apparent to those skilled in the art without departing from the scope of the invention as defined by the appended claims.

What is claimed is:

1. A method for configuring a plurality of handheld devices by a server in a communication network, the method comprising:
   associating, at the server, user requested configuration components with a group, the user requested configuration originating from an account without access to the server;
   assigning, at the server, the plurality of handheld devices to the group based on at least one of hardware and firmware configurations of the plurality of handheld devices, wherein the assigned group is associated with a predefined order of configuration components; and
   identifying, at the server, the configuration components associated with the assigned group for download to the plurality of handheld devices;
   downloading, for installation on the plurality of handheld devices, the configuration components associated with the assigned group according to the predefined order; and
   installing, on the plurality of handheld devices, the configuration components according to the predefined order of downloading.

2. The method of claim 1 further comprising reporting, by the plurality of handheld devices, to the server the results of installing the configuration components including successful component installations and failed component installations.

3. The method of claim 1, further comprising displaying, at a graphical user interface (GUI) display of the server, the configuration components in the predefined order for downloading, and modifying the predefined order.

4. The method of claim 1 wherein the configuration components downloaded comprise a configuration of software components.

5. The method of claim 4 wherein the at least one component of the software components downloaded is selected from the group of software components consisting of: a software application, and a software driver.

6. The method of claim 1 further comprising communicating from the plurality of handheld devices to the server an informational element for unique identification of the plurality of handheld devices, the informational element selected from the group of informational elements consisting of: a serial number, an operating system identifier, a device model number, IP addresses, and a terminal name.

7. A server comprising:
   a server configuration module for:
      associating user requested configuration components with a group, the user requested configuration originating from an account without access to the server;
      assigning a plurality of handheld devices to the group based on at least one of hardware and firmware configurations of the plurality of handheld devices, wherein the assigned group is associated with a predefined order of configuration components;
      identifying the configuration components associated with the assigned group for download to the plurality of handheld devices; and
      downloading the configuration components to the plurality of handheld devices of the assigned group according to the predefined order for installing the configuration components according to the predefined order of downloading on the plurality of handheld devices; and
   a communication interface to transmit the configuration components for download to the plurality of handheld devices of the assigned group.

8. The server system of claim 7 further comprising a graphical user interface display screen for displaying and updating the identified configuration components.

9. The server system of claim 7 further comprising automatically specifying pre-defined configuration components based on the user purchase order entry as sourced from a database of an order management system.

10. A handheld device in a communication network including a plurality of handheld devices and a server, the handheld device comprising:
   a processor;
   a memory;
   a device configuration module, the device configuration module including:
      a device download module for receiving user requested configuration components from the server, wherein the user requested configuration components are identified by the server based on a group that the handheld device is assigned to by the server, based on at least one of hardware and firmware configuration of the handheld device, wherein the group is associated with a predefined order of the user requested configuration components, the user requested configuration originating from an account without access to the server; and a device installation module for installing, in the memory of the handheld device, the downloaded configuration components from the server according to the predefined order for installing the configuration components according to the predefined order of the downloaded configuration components from the server.

11. The handheld device of claim 10 further comprising an update detection module for detecting an update request targeted to the group assigned, by the server, to include the handheld device.

12. The handheld device of claim 11 further comprising updating the installed configuration components.

13. The handheld device of claim 10 wherein the device configuration module communicates to the server an informational element for unique identification of the handheld device, the informational element selected from the group of informational elements consisting of: a serial number, an operating system identifier, a device model number, IP addresses, and a terminal name.

* * * * *